US009667780B1

(12) United States Patent
Neidermyer et al.

(10) Patent No.: US 9,667,780 B1
(45) Date of Patent: May 30, 2017

(54) SYSTEM AND METHOD FOR COMMUNICATION PROVIDER AND REMOTE DEVICE CONNECTION ANALYSIS

(71) Applicant: Interactive Intelligence Group, Inc., Indianapolis, IN (US)

(72) Inventors: Richard M. Neidermyer, Lititz, PA (US); Jon C. Melnik, Colden, NY (US)

(73) Assignee: Interactive Intelligence Group, Inc., Indianapolis, IN (US)

( * ) Notice: Subject to any disclaimer, the term of this patent is extended or adjusted under 35 U.S.C. 154(b) by 0 days.

(21) Appl. No.: 15/146,959

(22) Filed: May 5, 2016

(51) Int. Cl.
| H04M 1/24 | (2006.01) |
| H04M 3/08 | (2006.01) |
| H04M 3/22 | (2006.01) |
| H04M 3/00 | (2006.01) |
| H04M 5/00 | (2006.01) |
| H04M 3/42 | (2006.01) |
| H04M 3/537 | (2006.01) |
| H04M 1/57 | (2006.01) |

(52) U.S. Cl.
CPC ....... *H04M 3/42374* (2013.01); *H04M 1/573* (2013.01); *H04M 3/42365* (2013.01); *H04M 3/537* (2013.01)

(58) Field of Classification Search
CPC .. H04M 3/5158; H04M 3/5175; H04M 15/10; H04M 1/00; H04M 2201/18; H04M 2203/5018; H04M 2203/402; G06Q 10/04; G06Q 10/06311; G06Q 10/06315; H04W 4/16

USPC ........... 379/1.01, 9, 10.01, 10.02, 11, 15.01, 379/15.03, 27.01, 29.01, 29.06, 32.01, 379/32.04, 69, 70, 73, 82, 84, 85, 265.02, 379/265.03, 265.1, 266.1, 309, 32.02, 379/266.07, 308
See application file for complete search history.

(56) References Cited

U.S. PATENT DOCUMENTS

| 5,796,791 | A | * | 8/1998 | Polcyn | G07B 17/0008 379/100.01 |
| 5,907,601 | A | * | 5/1999 | David | H04M 3/5158 379/111 |
| 5,926,528 | A | * | 7/1999 | David | H04M 3/51 379/112.01 |
| 6,208,970 | B1 | * | 3/2001 | Ramanan | G10L 17/26 379/88.19 |
| 6,466,664 | B1 | * | 10/2002 | Zhao | H04M 3/5158 379/265.1 |
| 6,925,166 | B1 | * | 8/2005 | Chan | H04M 3/5158 379/265.02 |

(Continued)

*Primary Examiner* — Binh Tieu
(74) *Attorney, Agent, or Firm* — Ice Miller LLP

(57) ABSTRACT

A system and method are presented for analysis of a connection comprising a communication provider and a remote device. Known timing conditions may be used in the analysis to eliminate the impact of analysis delay on the contacted party flow. A point in time may be determined at which a live answer is no longer expected and an answering service answer may be expected using several factors. These factors comprise the routing time to/from the originating provider to a secondary provider as well as the time that the secondary provider alerts before transferring to a voice message service. Live answer determination may be categorized prior to the indication of a far-end connection and before the application of any media analysis routines.

40 Claims, 2 Drawing Sheets

(56) References Cited

U.S. PATENT DOCUMENTS

| | | | | |
|---|---|---|---|---|
| 8,411,844 B1* | 4/2013 | Anisimov | ........... | H04M 3/5158 |
| | | | | 379/265.01 |
| 8,649,500 B1* | 2/2014 | Cohen | ................. | H04M 3/5158 |
| | | | | 379/265.01 |
| 8,712,032 B1* | 4/2014 | Leary, II | ............. | H04M 3/5158 |
| | | | | 379/266.07 |
| 9,031,212 B1* | 5/2015 | Koster | ................ | H04M 3/5158 |
| | | | | 379/112.01 |
| 9,191,511 B1* | 11/2015 | Somani | ............... | H04M 3/5158 |
| 9,338,284 B1* | 5/2016 | Davis | .................... | H04M 3/367 |
| 2003/0185352 A1* | 10/2003 | Savage | ........... | H04M 1/274575 |
| | | | | 379/67.1 |
| 2007/0127699 A1* | 6/2007 | Lenard | ................ | H04M 3/5158 |
| | | | | 379/352 |

* cited by examiner

SYSTEM AND METHOD FOR COMMUNICATION PROVIDER AND REMOTE DEVICE CONNECTION ANALYSIS

BACKGROUND

The present invention generally relates to telecommunications systems and methods, as well as the connections between providers and devices. More particularly, the present invention pertains to the analysis of the connection between providers and answering devices.

SUMMARY

A system and method are presented for analysis of a connection comprising a communication provider and a remote device. Known timing conditions may be used in the analysis to eliminate the impact of analysis delay on the contacted party flow. A point in time may be determined at which a live answer is no longer expected and an answering service answer may be expected using several factors. These factors comprise the routing time to/from the originating provider to a secondary provider as well as the time that the secondary provider alerts before transferring to a voice message service. Live answer determination may be categorized prior to the indication of a far-end connection and before the application of any media analysis routines.

In one embodiment, a method is provided for communication analysis routines for identifying an answering device, associated with a remote contact, in a telecommunications system, wherein the system comprises an outbound communication application in a contact system environment which communicates over a network to the answering device, the method comprising the steps of: (a) placing an outbound communication, by the outbound communication application, to the remote contact; (b) receiving a signaling indication on a means for network communication from the remote contact and performing signaling analysis on the signaling indication, wherein the signaling analysis comprises applying timing constraint logic to the signaling indication; (c) determining if there is a timing disposition result whereas if there is a timing disposition result, continuing on to step (d), otherwise, beginning the process from step (b); (d) determining if media analysis is required, wherein if media analysis is required, performing the media analysis, and if media analysis is not required, proceeding to step (e); (e) receiving a disposition result and providing data on timing inputs to the timing constraint logic; and (f) declaring the disposition result.

In another embodiment, a method is provided for communication analysis routines for identifying an answering device, associated with a remote contact, in a telecommunications system, wherein the system comprises an outbound communication application in a contact system environment which communicates over a network to the answering device, the method comprising the steps of: (a) placing an outbound communication, by the outbound communication application, to the remote contact; (b) receiving a signaling indication on a means for network communication from the remote contact and performing signaling analysis on the signaling indication, wherein the signaling analysis comprises applying timing constraint logic to the signaling indication; (c) determining if there is a timing disposition result whereas if there is a timing disposition result, continuing on to step (d), otherwise, beginning the process from step (b); (d) receiving a disposition result and providing data on timing inputs to the timing constraint logic; and (e) declaring the disposition result.

DETAILED DESCRIPTION

Figure 1:
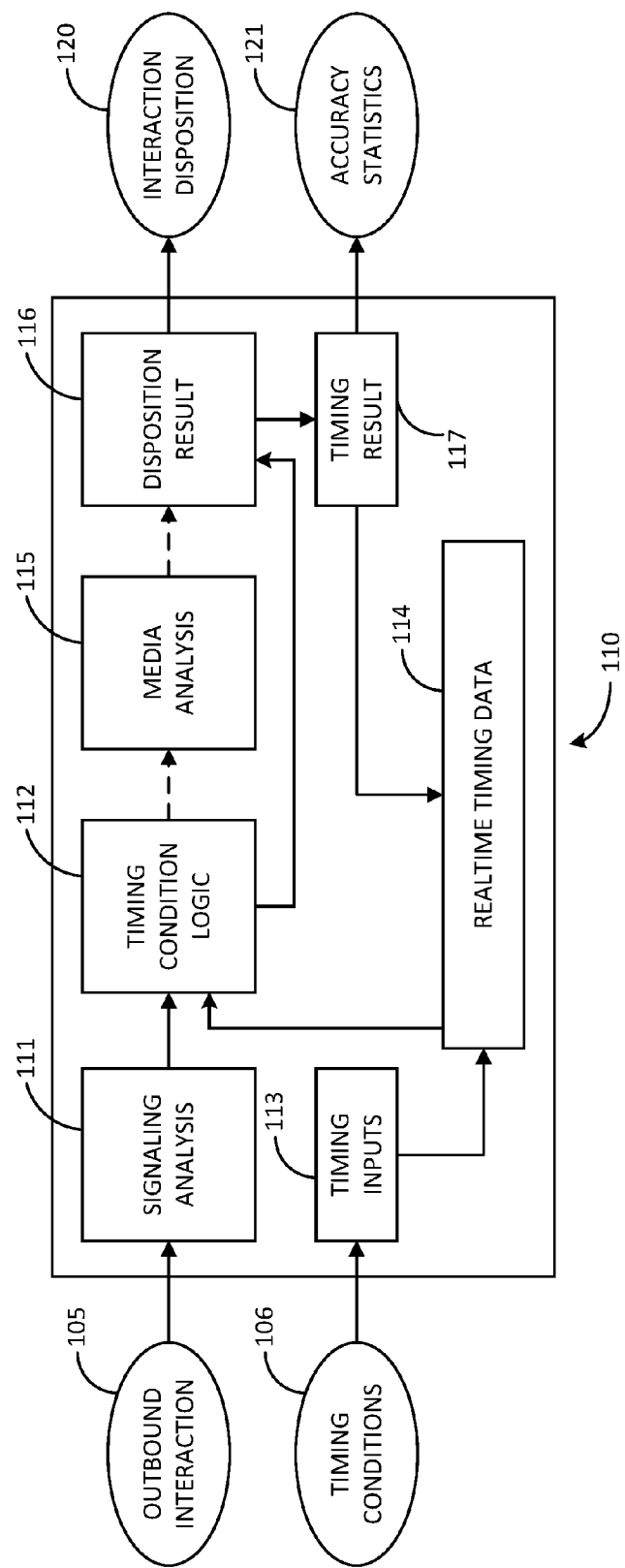
FIG. 1 is a functional block diagram illustrating an embodiment of provider and remote communication analysis.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

In a traditional communication analysis routine, line signaling analysis and media audio analysis are used to positively identify an answering device remote party as either a live party or a machine. A combination of these analyses may be used to determine the contacted party's answering type with focus on determining if the contacted party is a live voice answer versus an answering service or system answer.

Line signaling analysis may provide partial information with regards to the communication flow of the provider to the contacted device. Indicators may be provided by the signaling for when there is valid media on the communication. This information may be used to begin media analysis at appropriate times during the communication flow. This may typically allow for accurate pre-connection tone analysis, but does not provide benefit for post-connection answering type analysis.

Media analysis may be used during both pre-connection and post-connection phases of a communication. Pre-connection audio might include network tones as well as network recordings which indicate error conditions. Poor media analysis routines during this phase might result in false live voice answers. Media analysis in the post-connection phase might be used to detect answering indicator tones with the purpose of distinguishing between an answering machine and a live voice answer.

Connect supervision uses the line signaling to make a determination of when a communication has transitioned to a connected state. A system using connect supervision assumes completion of a communication analysis at the transition point and will not perform further media analysis. While this routine is fast, accuracy suffers and there is no attempt to differentiate between answering devices and live answers.

Systems which use traditional communication analysis routines consistently suffer from erroneous detections and additional media delay. False positives of answering machine or live voice detection are detrimental to system functionality because the false positives result in the wrong action being taken. As a result, customers and opportunities may be lost and increased operational costs incurred. Further, media delay may cause the cutting off of the beginning parts of speech to the originating party, resulting in awkward repeats of verbal answers. The media analysis routine for detecting a live voice answer requires that some amount of time passes during the analysis phase. The analysis at a minimum requires some detected speech to be provided as an input to obtain a determination result. During this phase, the communication flow cannot be acted on. A delay of full duplex audio connection results between the originating party and the contacted party.

Known timing conditions may be introduced to the analysis of the communication provider and the answering device in order to eliminate the impact of analysis delay on the contacted party flow. Traditional line signaling routines may be combined with a new timing routine to achieve more accurate live answer results and eliminate problems associated with live voice delay.

As communication switching paths become increasingly digital end-to-end within a single provider and between multiple providers, the timing of the route becomes more predictable. Using the knowledge of the time to route to/from the originating provider to a secondary provider and knowing the time that the secondary provider alerts before transferring to a voice message service, a system may reliably predict a point in time that live answer is no longer expected and an answering service answer is expected. Using this timing prediction, the system is able to categorize the live answer determination before the line signaling indicates a far-end connection and before any media analysis routines need to be applied. The live voice or answering machine/service determination is more accurate as a result and completed faster than the time needed to complete full media analysis.

FIG. 1 is a functional block diagram illustrating an embodiment of provider and remote communication analysis, indicated generally at 100, which may occur in the dialing system of a contact center environment. Components of the embodiment comprise inputs to the analysis component 110 of the dialing system, such as an outbound interaction 105 and timing conditions 106, and outputs from the analysis component 110, such as an interaction disposition 120 and accuracy statistics 121. The analysis component 110 might comprise modules to perform signaling analysis 111 on an interaction, apply timing condition logic 112, apply timing inputs 113, apply timing data 114, perform media analysis 115, obtain a disposition result 116, and obtain timing results 117.

Inputs to the analysis component 110 might comprise an outbound interaction 105 and timing conditions 106. An outbound interaction 105 might comprise an outgoing communication in a telephony system, such as calls, or callbacks. Calls might comprise a media type, such as data or voice. In an embodiment, the outbound communication application may be attempting to reach system users who are remote from the system, such as remote employees with a company. In another embodiment, the outbound interaction 105 may be part of an outbound interaction campaign, such as a dialer campaign in a contact center environment.

Known inputs, such as timing conditions 106 may also be used by the analysis component 110 to make a prediction. The timing conditions might comprise a contacting provider, a contacted device, and the contacted path. In an embodiment, the contacting provider might comprise a communication provider, or carrier, which indicates a time associated with a specific provider endpoint. The provider endpoint may comprise any connected endpoint on the system capable of providing a path for an outbound interaction. The provider might comprise a single time value, but may also comprise a database of time values associated with the contacted device. At the time of initiating an outbound interaction through an outbound communication application, the system will know which provider is being used to place the interaction and uses the corresponding contacting provider input for its timing component of contact analysis routines.

In an embodiment, the contacted device input indicates a time associated with a specific contacted endpoint. The contacted device input might comprise an ID, a phone number, or an address. For example, a phone number may be used to map to a specific device type that is being used to reach a party (e.g., a system user or a customer). The phone number and the device type are registered with the system. Input may comprise a single time value or multiple values. In a multiple value scenario, each value is associated with a different access provider. At the time of initiation of the outbound interaction, the system knows which contacted device it is attempting to reach and the appropriate input for the timing component of the contact analysis routine.

The path might comprise a call path. In an embodiment, line signaling on certain protocols is capable of providing routing information of a specific interaction through a network. Diversion, contacted number, and feature elements may be provided on the communication route that provides identifying information of the path of the call. Similar to the inputs for the contacting provider and the contacted device, time values may be associated with elements on the system. At times, during the progression of an outbound interaction, the system receives elements of its contacted path and applies the data as input for the timing component of contact analysis routines. Time values of the path may be set upon system start and gradually improved upon by system learning.

The analysis component 110 might comprise a plurality of modules to perform the analysis and of the interaction. Signaling analysis 111 is performed on an outbound interaction. Timing condition logic 112 is applied once a signaling indication is received. The timing condition logic 112 may use timing inputs 113 and real-time timing data 114. Media analysis 115 may be performed if necessary. Modules may also obtain a disposition result 116 and obtain timing results 117. The analysis component function is described in greater detail in FIG. 2 below. A general flow is provided as to how the modules within the analysis component 110 interact in FIG. 2 below.

Outputs from the analysis component 110 might comprise an interaction disposition 120 and accuracy statistics 121. The accuracy statistics 121 may provide feedback to improve the timing condition logic in the system. The interaction disposition 120 indicates whether a machine or a voice has been detected by the system.

Figure 2:
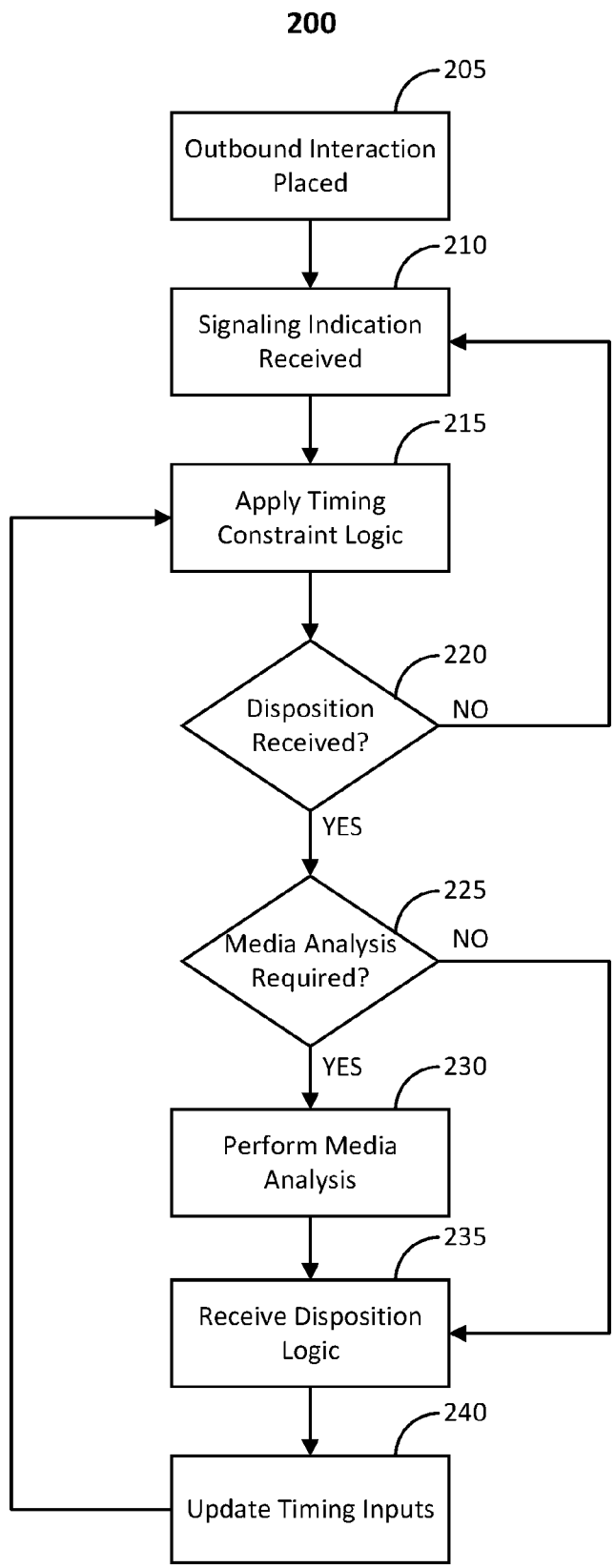
FIG. 2 is a flowchart illustrating an embodiment of a process for provider and remote communication analysis.

FIG. 2 is a flowchart illustrating an embodiment of a process for provider and remote communication analysis, indicated generally at 200. The process 200 occurs in the analysis component 110 of FIG. 1. The process 200 may be cyclical and may be updated dynamically. For example, dynamic updates may occur during an outbound dialing campaign in a contact center environment or from any outgoing contact attempt from the system. In an embodiment, a collective of systems sharing the same database may also receive dynamically applied updates.

In operation 205, an outbound interaction is placed. The outbound interaction may be placed using an outbound contact application, such as an outbound call processing system or an outbound dialing application, for example. In an embodiment, an outbound dialing campaign may occur in a contact center environment, where interactions are placed by agents to contacts. Interactions may comprise outgoing communications in a telephony system, such as calls, or callbacks. In another embodiment, the outbound contact application may be attempting to reach users who are remote from the system, such as remote employees with a company. Control is passed to operation 210 and process 200 continues.

In operation 210, a signaling indication is received. For example, the signaling indication may be received at a means for network communication such as a network adaptor or a digital interface. The signaling indicator may provide information as to whether or not there is valid media on the communication. In an embodiment, valid media comprises a media stream where the provider has provided a protocol signaling event indicating that the provider has completed the audio switch with its equipment and is now delivering audio on the communication path. Control is passed to operation 215 and process 200 continues.

In operation 215, timing constraint logic is applied. For example, the timing constraint logic comprises inputs that the timing routine uses to make predictions. In an embodiment, these are known inputs that infrequently change and are analyzed together during the prediction phase. The inputs may also be obtained by system learning, where multiple communication attempts directed towards live answers and answering devices are made. The system may record the timing of these attempts and use that data to calculate and improve the inputs to make the communication analysis more accurate over time.

In an embodiment, inputs may comprise a communication provider, a contacted device, and/or a communication path, to name a few non-limiting examples. A communication provider may comprise an endpoint of hardware, such as a physical connection to a digital network through a router or a physical connection to telephony switching equipment. Provider connections for an outbound communication may be traditionally labeled (e.g., SIP, Broadcom/Satellite) and be service ordered for the system. The contacted device may comprise a physical phone off of a telephony network (such as hard wired or cellular) or a device, such as a computer/tablet, which is capable of providing live voice and alternative answering capabilities, to name a few non-limiting examples.

The communication provider (or carrier) input may indicate a time associated with a specific provider endpoint. The provider endpoint may comprise any connected endpoint on the system that is capable of providing a communication path for an outbound communication. The input may comprise a single time value or a database of time values associated with the contacted device type. At the time of initiating an outgoing communication, the system knows which provider is being used to place the communication. The communication provider input for the timing component of communication analysis routines is thus used.

The contacted device input may comprise an ID, a phone number, or an address, to name a few non-limiting examples. The inputs indicate a time associated with a specific contacted endpoint. At the time of initiating an outbound communication, the system will know which contacted device it is attempting to reach and use that contacted device input for the timing component of communication analysis routines. For example, a phone number might map to a specific device type being used to reach a user or customer of the system. The phone number and the device type are registered with the system. Information associated with the number may also be noted, such as whether the number belongs to a mobile phone and who is the carrier (e.g., Verizon, Sprint, T-Mobile). The input may comprise a single time value or multiple values with each one associated with a different access provider.

In an embodiment, the communication path information may be determined from line signaling on certain protocols which are capable of providing routing information of a specific communication through a network. The signaling information may be received in real-time during the communication, which provides indicators of the path the communication is taking. As such, real-time path time values may be input to recalculate answer time predictions and improved through system learning.

Diversion, contacted number, and feature elements may be provided on the communication route that provide identifying information of the path of the communication. Similar to the communication provider and contacted device, those elements may have time values associated with them on the system. At times during the progression of an outbound communication, the system may receive elements of its contacted path and apply the data as input for the timing component of communication analysis routines. A path may also vary if network equipment does not work due to failure or servicing.

The timing inputs, along with real-time timing data are used by the timing condition logic 112 (FIG. 1) in the analysis component 110. In an embodiment, the timing conditions function to eliminate the need for media analysis in obtaining a disposition result. Control is passed to operation 220 and process 200 continues.

In operation 220, it is determined whether a timing disposition result has been received. If it is determined that a timing disposition result has been received, control is passed to operation 225 and process 200 continues. If it is determined that a timing disposition result has not been received, control is passed back to operation 210 and process 200 continues.

The determination in operation 220 may be the result of an algorithm application. In an embodiment, the current duration (e.g. time) is monitored for the interaction. When the time elapsed matches a pre-determined time input, a timing disposition may be issued. In an embodiment, clock measurement may be supplied by means which the software accesses through the operating system, such as the computer hardware or a CPU.

In operation 225, it is determined whether media analysis is required. If it is determined that media analysis is required, control is passed to operation 230 and process 200 continues. If it is determined that media analysis is not required, control is passed to operation 235 and process 200 continues.

The determination in operation 225 may be the result of an algorithm application. In an embodiment, the accumulated timing inputs may dictate the confidence of those inputs. For example, a sample size of three combinations results in a low confidence if those resulting times vary greatly. A sample size of 100, all of which resulting times fit a narrow range, results in a higher confidence. If the timing input is of a lower confidence, then the sliding scale from the median of when media analysis must be invoked will be larger. Thus, there is a larger window of when the line connection event requires additional media analysis rather than depending on just timing analysis. A high confidence timing input, in an embodiment, might indicate that windows will be very small and the timing analysis will be applicable. As such, the disposition is faster and more accurate.

In an embodiment, the determination to perform media analysis may be confidence driven or configurable. Media analysis is not necessary for all scenarios, but may be useful in confirming results or as a backup in unknown scenarios.

In operation 230, media analysis is performed. For example, audio samples may be measured using means such as algorithms to determine whether the answering agent is a machine, a provider answering service, a built-in application, or whether a live voice has answered. This step is optional. Control is passed to operation 235 and process 200 continues.

In operation 235, a disposition result is received and declared. For example, disposition results might comprise the following: live, machine, network announcement, or a tone, to name a few non-limiting examples. Examples of tones might comprise busy, failure, SIT, and Fax. Control is passed to operation 240 and process 200 continues.

In operation 240, the timing inputs are updated. For example, each outgoing interaction may have an opportunity to provide its resulting timing input to the dialing system. In an embodiment, there may be one set of inputs per outgoing connection attempt. The system collects all inputs and processes. The timing marks may be categorized (such as time to connect as live answer, time to connect as machine, time to connect as <other>). The statistical mean and derivations may be determined and used as the timing inputs for the next outgoing interaction that matches the provider, device, or path being utilized. Referring back to FIG. 1 as an example, timing results 117 from the disposition result 116 may be applied to the real-time timing data 114 and used to improve the accuracy of the timing condition logic 112 as well as provide accuracy statistics 121. Control is passed to operation 215 and process 200 continues.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method for communication analysis routines for identifying an answering device, associated with a remote contact, in a telecommunications system, wherein the system comprises an outbound communication application in a contact center system environment which communicates over a network to the answering device, the method comprising the steps of:
   a. placing an outbound communication, by the outbound communication application, to the remote contact;
   b. receiving a signaling indication on a network adaptor from the remote contact and performing signaling analysis on the signaling indication, wherein the signaling analysis comprises applying timing constraint logic to the signaling indication;
   c. determining if there is a timing disposition result whereas if there is a timing disposition result, continuing on to step (d), otherwise, beginning the process from step (b);
   d. determining if media analysis is required, wherein if media analysis is required, performing the media analysis, and if media analysis is not required, proceeding to step (e);
   e. receiving a disposition result and providing data on timing inputs to the timing constraint logic, wherein the data is applied by an analysis component to improve the timing constraint logic through system learning; and
   f. declaring the disposition result.

2. The method of claim 1, wherein the outbound communication comprises a call.

3. The method of claim 2, wherein the call comprises a media type.

4. The method of claim 3, wherein the media type comprises at least one of: voice or data.

5. The method of claim 1, wherein the outbound communication application comprises an outbound dialer application.

6. The method of claim 1, wherein the timing constraint logic includes communication timing inputs, which comprise timing characteristics of one or more of: the communication provider, the answering device, and the communication path.

7. The method of claim 6, wherein the communication provider indicates a time associated with a specific provider endpoint.

8. The method of claim 7, wherein the endpoint comprises a connected endpoint to the system, wherein the endpoint is capable of providing a communication path for an outbound communication.

9. The method of claim 6, wherein the input comprises a database of time values associated with at least one of: a type of answering device and the communication path.

10. The method of claim 6, wherein the communication provider time is capable of improvement through system learning.

11. The method of claim 6, wherein the answering device indicates an answering device time associated with the endpoint, wherein the answering device time further comprises at least one of: an ID, a phone number, and an address mapping to a specific device.

12. The method of claim 11, wherein the answering device time values are capable of improvement through system learning.

13. The method of claim 11, wherein the answering device utilizes an answering agent when the communication is unanswered.

14. The method of claim 13, wherein the answering agent comprises one or more of: an answering machine, a provider answering service, and a built-in application.

15. The method of claim 6, wherein the communication path comprises routing information of a specific communication through the network.

16. The method of claim 15, wherein the communication path is determined through signaling information received in real-time during the communication, wherein the signaling information provides indicators of the communication path.

17. The method of claim 16, further comprising inputting real-time communication path values to determine answer time predictions, wherein the predications are capable of improvement through system learning.

18. The method of claim 16, wherein the communication path varies.

19. The method of claim 18, wherein the variance is due to failure or servicing.

20. The method of claim 1, wherein the determining of step (c) comprises comparing elapsed time of the outbound communication with a pre-determined threshold.

21. A method for communication analysis routines for identifying an answering device, associated with a remote contact, in a telecommunications system, wherein the system comprises an outbound communication application in a contact center system environment which communicates over a network to the answering device, the method comprising the steps of:
  a. placing an outbound communication, by the outbound communication application, to the remote contact;
  b. receiving a signaling indication on a network adaptor from the remote contact and performing signaling analysis on the signaling indication, wherein the signaling analysis comprises applying timing constraint logic to the signaling indication;
  c. determining if there is a timing disposition result whereas if there is a timing disposition result, continuing on to step (d), otherwise, beginning the process from step (b);
  d. receiving a disposition result and providing data on timing inputs to the timing constraint logic, wherein the data is applied by an analysis component to improve the timing constraint logic through system learning; and
  e. declaring the disposition result.

22. The method of claim 21, wherein the outbound communication comprises a call.

23. The method of claim 22, wherein the call comprises a media type.

24. The method of claim 23, wherein the media type comprises at least one of: voice or data.

25. The method of claim 21, wherein the outbound communication application comprises an outbound dialer application.

26. The method of claim 21, wherein the timing constraint logic includes communication timing inputs, which comprise timing characteristics of one or more of: the communication provider, the answering device, and the communication path.

27. The method of claim 26, wherein the communication provider indicates a time associated with a specific provider endpoint.

28. The method of claim 27, wherein the endpoint comprises a connected endpoint to the system, wherein the endpoint is capable of providing a communication path for an outbound communication.

29. The method of claim 26, wherein the inputs comprise a database of time values associated with at least one of: a type of answering device and the communication path.

30. The method of claim 26, wherein the communication provider time is capable of improvement through system learning.

31. The method of claim 26, wherein the answering device indicates an answering device time associated with the endpoint, wherein the answering device time further comprises at least one of: an ID, a phone number, and an address mapping to a specific device.

32. The method of claim 31, wherein the answering device time values are capable of improvement through system learning.

33. The method of claim 31, wherein the answering device utilizes an answering agent when the communication is unanswered.

34. The method of claim 33, wherein the answering agent comprises one or more of: an answering machine, a provider answering service, and a built-in application.

35. The method of claim 26, wherein the communication path comprises routing information of a specific communication through the network.

36. The method of claim 35, wherein the communication path is determined through signaling information received in real-time during the communication, wherein the signaling information provides indicators of the communication path.

37. The method of claim 36, further comprising inputting real-time communication path values to determine answer time predictions, wherein the predications are capable of improvement through system learning.

38. The method of claim 36, wherein the communication path varies.

39. The method of claim 38, wherein the variance is due to failure or servicing.

40. The method of claim 21, wherein the determining of step (c) comprises comparing elapsed time of the outbound communication with a pre-determined threshold.

* * * * *